Figure 1:
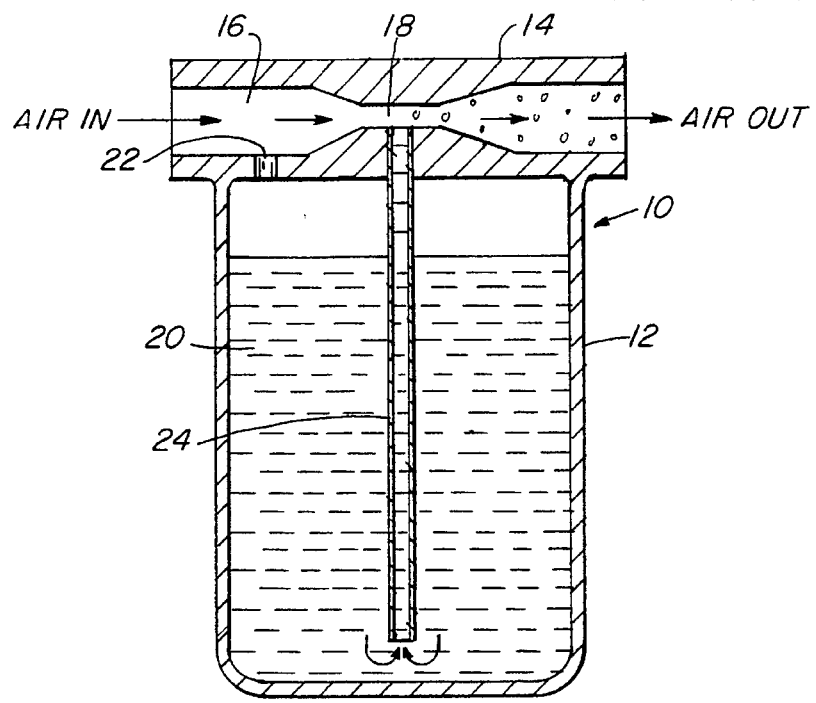

United States Patent [19]

Foltz

[11] Patent Number: 5,513,722
[45] Date of Patent: May 7, 1996

[54] COMPRESSED AIR LUBRICATOR

[76] Inventor: Donald R. Foltz, 175 Reed Dr., Pittsburgh, Pa. 15205

[21] Appl. No.: 401,769

[22] Filed: Mar. 10, 1995

[51] Int. Cl.$^6$ ....................................................... F16N 7/30
[52] U.S. Cl. ...................... 184/55.2; 184/58; 261/122.1; 55/255
[58] Field of Search .................................. 184/55.1, 55.2, 184/57, 58, 59; 261/122; 55/255

[56] References Cited

U.S. PATENT DOCUMENTS

| | | |
|---|---|---|
| 362,667 | 5/1887 | Schaffstadt et al. .................. 184/59 |
| 1,834,092 | 12/1931 | Decrow . |
| 2,111,583 | 3/1938 | Mooy ................................. 184/55.2 |
| 2,229,176 | 1/1941 | Kehle ................................. 184/55.2 |
| 2,405,494 | 8/1946 | Dupuy ................................. 55/255 |
| 2,456,270 | 12/1948 | Giwosky et al. .................. 184/55.2 |
| 2,474,746 | 6/1949 | Lopez et al. ....................... 184/55.2 |
| 2,530,716 | 11/1950 | Meynier . |
| 2,602,523 | 7/1952 | Freas ................................. 184/55.2 |
| 2,606,751 | 8/1952 | LaCoste . |
| 2,735,512 | 2/1956 | Faust . |
| 2,742,886 | 4/1956 | McPherson . |
| 2,767,807 | 10/1956 | Booth . |
| 2,865,460 | 12/1958 | Lyden . |
| 2,873,818 | 2/1959 | Veres . |
| 3,199,847 | 8/1965 | Wahnish . |
| 3,352,545 | 11/1967 | Denine . |
| 3,545,731 | 12/1970 | McMannus . |
| 3,734,474 | 5/1973 | Olati . |
| 3,785,461 | 1/1974 | Rompa ................................. 184/55.2 |
| 4,997,598 | 3/1991 | Aleem-Uddin . |
| 5,074,276 | 12/1991 | Brown . |

FOREIGN PATENT DOCUMENTS

| | | | |
|---|---|---|---|
| 0237606 | 9/1987 | European Pat. Off. ........... | 184/55.2 |
| 0424376 | 1/1926 | Germany ......................... | 184/55.2 |

*Primary Examiner*—Thomas E. Denion
*Attorney, Agent, or Firm*—J. Stewart Brams

[57] ABSTRACT

A compressed air lubricator with a novel and improved means for dispersing lubricant into small particle sizes and providing for their introduction into and uniform distribution within an air stream flowing through the lubricator.

33 Claims, 1 Drawing Sheet

COMPRESSED AIR LUBRICATOR

BACKGROUND OF THE INVENTION

This invention is concerned with compressed air lubricators for creating an airborne lubricant dispersion in an air stream to lubricate mechanical apparatus of various sorts, for example pneumatic power units.

In the art of lubricators it is well known to provide apparatus for introducing finely divided liquid lubricant into a stream of compressed air for delivery to the equipment to be lubricated. Prior art compressed air lubricators typically introduce liquid lubricant into an air stream in droplet or film form. The shear or impact forces of high velocity air flowing through the lubricator disintegrate the lubricant film or droplets into a lubricant particle size intended to be suitable for traveling in the air stream to the equipment requiring lubrication. The resultant lubricant particle size, however, often is too large and the lubricant particles tend to deposit in the air line. To the extent the lubricant thus fails to reach the equipment requiring lubrication, the lubricating apparatus may be of limited effectiveness.

A conventional compressed air lubricator is shown in FIG. 1. Lubricator 10 comprises a vessel 12 having a head section 14 with an air flow path 16 formed to include a flow restriction such as a venturi throat 18. Head section 14 is carried atop and communicates with a lubricant reservoir section 20 within vessel 12. In operation, compressed air enters air flow path 16 at one side of head section 14, traverses the flow path 16, and exits at the other side as shown by the flow arrows in FIG. 1. As the air flow passes through venturi throat 18 its velocity increases and its pressure decreases due to the reduction in the cross sectional flow area, as is well known.

A port 22 communicates between reservoir 20 and the inlet or upstream side of flow path 16, whereby the reservoir static pressure is essentially the same as that in the inlet of flow path 16. The pressure exerted on the surface of the lubricant pool in reservoir 20 thus is greater than the pressure within venturi throat 18. A tube 24 has an upper open end which opens into venturi throat 18, and a lower open end which is submerged in the lubricant pool. The described pressure differential between reservoir 20 and venturi throat 18 impels a flow of lubricant upwardly through tube 24 so that droplets of lubricant emerge from the upper end of tube 24 in venturi throat 18. High air flow velocity and turbulence in venturi throat 18 shear off the droplets emerging from tube 24 and disintegrate or subdivide them into smaller particles. These lubricant particles are carried by the high velocity air stream from venturi throat 18 and on through the compressed air line toward the equipment to be lubricated.

In addition to such a conventional lubricator, the art includes the following. U.S. Pat. Nos. 2,873,818, 2,735,512, 2,767,807 and 2,865,469 disclose solid, porous wicks or the like in air line lubricators.

U.S. Pat. Nos. 2,742,886 and 5,074,273 disclose fluid feed arrangements which include generation of fluid particles which are then passed through media. Both of these patents relate to fuel generating and delivery systems and not to airline lubricators. U.S. Pat. Nos. 3,734,474, 3,352,545, 2,530,716, 3,545,731 and 4,997,598 disclose porous fluid conveying elements.

U.S. Pat. No. 1,834,092 discloses a lubricator which includes a wick of fibrous material. Finally, U.S. Pat. Nos. 3,199,847 and 2,606,751 disclose fuel feed-through structures for carburetors.

Although the rate of lubricant introduction into a compressed air stream can be regulated by proper selection of the venturi throat and feed tube size, the particle size is also influenced by the air flow velocity. At reduced air flow rates, lubricant particle size tends to increase, thus increasing the ratio of lubricant to air. Larger lubricant particles will not as readily remain in suspension in the air stream, and accordingly the average suspension time of the lubricant particles is inversely related to particle size. Since at lower air flow velocity the suspended lubricant particles will travel a shorter distance in a given time, lubricant delivery is negatively influenced by either or both of increased lubricant particle size and decreased air stream flow rate.

The present invention contemplates a compressed air lubricator or the like which is capable of continuously introducing a finely divided liquid lubricant into a compressed air stream in liquid aerosol form comprised of lubricant particles of a controlled mean diameter in the size range of 1 micron or smaller. These very small lubricant particles will remain in suspension in an air stream longer than larger lubricant particles. Therefore, they are capable of being carried throughout a piping system to pneumatic or other equipment requiring lubrication, without prematurely depositing on interior surfaces of the compressed air lines which carry the lubricant.

The invention also permits an essentially constant ratio of liquid lubricant to air to be maintained regardless of changes in air pressure or flow, thereby assuring consistent lubricating capability under varying equipment air flow requirements.

More particularly, the invention contemplates a compressed air lubricator having structure for introducing an air flow into a pool of liquid lubricant within a reservoir as a myriad of small air bubbles which then percolate up through the liquid lubricant pool and burst at its surface to create a mist of lubricant particles entrained in the air above the lubricant pool. The lubricant particles thus generated may occur in a range of particle sizes. Accordingly, the invention further contemplates means for separating larger lubricant particles from smaller ones, and for allowing the smaller lubricant particles to move toward a location where they may be entrained in a compressed air flow while the larger lubricant particles are returned to the liquid lubricant pool.

Still further, the invention contemplates improved structure for a compressed air flow path through a lubricator for further separating relatively larger lubricant particles from relatively smaller ones and allowing only the smaller lubricant particles to pass into the compressed air stream to be entrained therein.

With the improvements as characterized, a novel and improved compressed air lubricator is provided which is capable of enhancing delivery of liquid lubricant via a compressed air stream to pneumatic equipment and the like by improved control over a lubricant aerosol generating process which consistently produces, in a novel manner, much smaller lubricant particles than commonly produced by prior compressed air lubricators.

Accordingly it is one object of the invention to provide a novel and improved compressed air lubricator and method.

Another object of the invention is to provide novel and improved method and apparatus for dispersing liquid lubricant into finely divided particles for entrainment of such particles in a flow of air passing through a lubricator.

Figure 2:
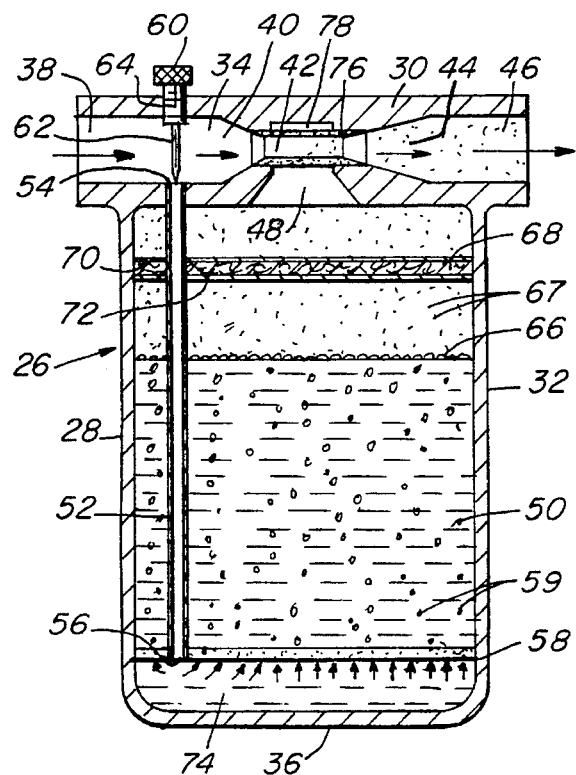

These and other objects and further advantages of the invention will be more readily appreciated upon consideration of the following detailed description and the accompanying drawings, in which:

FIG. 1 is a sectioned side elevation of a prior art compressed air lubricator as described hereinabove; and FIG. 2 is a sectioned side elevation of a presently preferred embodiment of the invention.

Referring to FIG. 2, a lubricator 26 is comprised of a housing 28 which includes a head portion 30 disposed atop a reservoir portion 32. Head portion 30 and reservoir portion 32 are shown as a unitary structure only for purposes of convenient illustration. The head portion 30 may be releasably attached to reservoir portion 32 by any suitable and appropriate means to permit the head portion 30 and reservoir portion 32 to be selectively disconnected from each other for such purposes as cleaning, maintenance, and periodic refilling of the reservoir. Similarly, any suitable and appropriate selectively operable closure may be provided in the base 36 of reservoir 32 to further facilitate maintenance and cleaning.

A compressed air flow path 34 formed in head portion 30 is comprised of an inlet section 38 which may preferably be of essentially uniform cross sectional area, a convergent section 40, a restricted throat section 42, a divergent section 44 and an outlet section 46 which preferably is of essentially the same uniform cross sectional area as inlet section 38.

An opening 48 communicates between restricted throat section 42 and an upper portion of an interior space 50 within reservoir 32.

An elongated, open ended tube 52 has an upper open end 54 which opens into inlet section 38 of flow path 34, and a lower open end 56 which opens into a lower portion of reservoir interior space 50. Open end 56 of tube 52 is disposed beneath an expanse of suitable porous or perforated media 58 which preferably extends across substantially the entire cross sectional area of the reservoir interior space 50.

A suitably adjustable needle valve assembly 60 is disposed with respect to the upper open end 54 of tube 52 such that a needle valve element 62 is axially adjustable with respect to open end 54 to permit adjustment of air flow within tube 52 from inlet flow path portion 38 to the lower open end 56 of tube 52, as described hereinbelow. For example, needle valve assembly 60 may include a screw portion 64 which is engaged within a cooperably threaded opening in head portion 30 to permit selective, continuous adjustment of needle 62 axially inward and outward with respect to the adjacent open end 54 of tube 52.

Reservoir interior space 50 is intended to be filled with a volume of liquid lubricant to a selected level, for example as indicated at 66 in FIG. 2. A filter assembly 68 is disposed above the elevation of level 66 and preferably extends across substantially the entire cross sectional area of reservoir interior space 50. Filter assembly 68 is comprised of upper and lower expanses of screen or similar perforated members 70 between which is confined a filtering bed or media 72, fiberglass for example. Filter bed 72 may include a blend of glass strands and microfibers such as type AF-11 as manufactured by Manville Products Corporation. This type of in-depth filter bed operates on the principle of the fibers collecting liquid particles by three mechanisms: impingement, interception and diffusion. Impingement collection results when liquid particles impact the filter fiber. Interception occurs when liquid particles graze the fiber and adhere to it. Diffusion occurs when liquid particles of sufficiently small size move at random independent of the air flow through the filter bed and thus deposit on the filter fibers.

A variety of alternative filter media or combinations of available filter media with similar filtering characteristics to those described herein are available and may be used as alternatives to the specified filter bed media. In addition, filter assembly 68 may include a backing material on its upper side to prevent upward migration of filter element fibers. Such a backing can be disposed between the upper face of the filter media and the upper screen member 70. One suitable backing, for example, may be woven fiberglass fabric, style 7628, 42×32 construction, plain weave, 0.007 inches thick, as manufactured by Burlington Glass Fabrics Company.

In operation of the invention as thus far described, compressed air enters inlet section 38 of flow path 34 and passes therethrough at essentially constant velocity and static pressure. The air flow then enters convergent flow path section 40 wherein the air flow velocity increases due to the decreasing cross sectional flow area. The air flow passes through restricted throat portion 42 at a maximum flow velocity since the cross sectional flow area there is a minimum. High velocity of air flowing through restricted throat portion 42 causes reduced static pressure in this zone. The air flow then proceeds from the restricted throat portion 42 through divergent section 44 wherein the air flow velocity decreases and static pressure increases due to the increasing cross sectional flow area. Finally, the air flow passes through outlet flow path portion 46 and exits the lubricator apparatus. The design of the air flow path preferably will provide a static air pressure at the outlet side of flow path 34 which is essentially the same as the static pressure at the inlet side, although a very small drop in static pressure between the inlet and the outlet may be observed due to frictional losses.

The static air pressure in tube 52 will be essentially the same as the static air pressure in flow path inlet section 38. Similarly, the static pressure within opening 48 will be essentially the same as the pressure within restricted throat portion 42. Accordingly, as both opening 48 and tube 52 communicate with interior space 50, a pressure gradient through space 50 from the lower open end 56 of tube 52 to the opening 48 is generated by the flow of compressed air through flow path 34 as above described.

This pressure gradient causes air to flow from inlet section 38 down through tube 52 at a flow rate which is suitably adjusted by adjustment of needle valve assembly 60. The air flowing downwardly through tube 52 passes into the liquid lubricant contained within a lower zone 74 of reservoir interior space 50 beneath porous media 58. The air then passes upwardly in the lubricant due to both its buoyancy in the liquid lubricant and the pressure difference between upper and lower portions of the reservoir interior space 50. In moving upward through porous media 58 the air forms a multiplicity of bubbles 59 in the liquid lubricant which continue upwardly through the volume of liquid lubricant toward its surface 66.

In lieu of the porous media 58 described hereinabove, the desired air bubbles 59 in the liquid lubricant may be generated by having lower open end 56 of tube 52 connected to a porous septum, sparger or aerating device of suitable size and configuration.

The air bubbles 59 continue rising upwardly through the liquid lubricant within reservoir space 50 and burst as they emerge from the surface 66 of the lubricant thus forming a polydisperse mist of airborne lubricant particles 67. Generally, the lubricant particle size, depending upon the air flow rate and characteristics of the lubricant, will range from submicronic to 100 microns mean diameter. The larger of particles 67, due to gravity and the relatively low upward air velocity, will drop back onto the lubricant surface 66. The smaller particles 67 will rise vertically with the air flow and pass through filter assembly 68.

The purpose of filter assembly 68, and more particularly the filter media 72, is to capture lubricant particles larger than a specified size so that only the very smallest lubricant particles will continue through opening 48 and be dispersed into the compressed air stream flowing through flow path 34. Examples of suitable materials for filter media 72 to achieve the desired particle filtering effect have been set forth hereinabove.

The filter media 72 preferably is selected to maximize the filtering mechanisms of impingement and interception discussed hereinabove as these mechanisms are the most effective for collecting lubricant particles larger than one micron diameter, but are relatively ineffective for collecting smaller particles. Thus, as the airborne lubricant particles 67 pass through filter assembly 68, the liquid lubricant particles larger than one micron collect on the filter media and coalesce; that is, they grow in size. The coalesced particles ultimately become sufficiently large that they drain downwardly by gravity through the filter media 72 and drop onto the surface 66 of the liquid lubricant. Particles smaller than one micron diameter will generally pass through filter media 72, remaining airborne as they continue to travel upwardly through opening 48 and into restricted throat portion 42 where they are dispersed into the air stream flowing therethrough as described hereinbelow.

Head portion 30 of the lubricator 26 includes a rigid filter media tube 76 which forms the restricted throat portion 42, and may also form an adjacent portion of each of the convergent portion 40 and divergent portion 44 of the flow path 34. The filter media tube 76 is formed of a suitable material having a controlled permeability such as by incorporating omnidirectional interconnecting pores throughout its material mass. Suitable materials for this application may be, for example, high density polyethylene, sintered bronze or stainless steel, and so forth. One acceptable material, for example, may be sintered 316 stainless steel having an average pore size of 10 microns as manufactured by Mott Metallurgical Corporation. The average pore size selected for the material utilized for tube 76 may range from approximately 0.2 microns up to approximately 100 microns, depending on the application requirements.

Head portion 30 of lubricator 26 further is suitably formed to provide a generally annular space 78 about an outer periphery of tube 76, so that opening 48 communicates via space 78 with the corresponding part of the outer periphery of tube 76. This allows lubricant particles to reach a cylindrical exterior surface portion of tube 76 extending circumferentially about its periphery and over preferably a major part of its axial length. Lubricant particles may thus pass through the described pores in tube 76 and be introduced into the air flow passing through throat portion 42 with far more uniform distribution than is possible with a single lubricant outlet communicating with a lubricator throat as in some prior compressed air lubricators.

The lubricant particles 67 moving with the pressure driven air flow upwardly into opening 48, pass into space 78 and surround tube 76. The lubricant particles then pass through the omnidirectional pores in tube 76 with generally uniform distribution, whereupon they are dispersed into the air flow passing through restricted throat section 42. The average pore size for the material of tube 76 is selected such that the flow rate of the air and lubricant particle mixture passing through the pores of tube 76 into restricted throat section 42 will be proportional to the flow rate of air flowing in path 34 through restricted throat section 42. The size range of lubricant particles emerging from the inside wall of tube 76 will depend upon both the pore size of the material from which tube 76 is formed, and the size of the lubricant particles entering the pores at the exterior surface of tube 76. In general, submicronic particles should be able to pass through the porous material of tube 76 to become entrained in the air stream. Larger size particles should coalesce within the pores of the tube 76 material and, driven by the pressure differential between space 78 and restricted throat section 42, emerge from the pores into restricted throat 42 as bubbles which burst and thereby generate additional submicronic particles which are introduced into the air stream passing through flow path 34.

The concentration of liquid lubricant particles in the air stream flowing out of the lubricator air flow path 34 is adjustable by means of needle valve assembly 60, with an adjustment for greater air flow rate downwardly through tube 52 corresponding to greater concentration of lubricant particles in the air flowing through the outlet section 46 of flow path 34. Once this adjustment is made, the concentration of liquid lubricant particles in the effluent air stream will remain essentially constant regardless of variations, within limits, in the inlet air flow pressure and flow.

In accordance with the above description, I have invented a novel and improved lubricator apparatus. Of course, I have envisioned various alternatives and modified embodiments of the invention. For example, the porous or permeable venturi throat structure described hereinabove with reference to tube 76, and the bubble generating and filtering structure described with reference to elements 58 and 68, may be used independently of each other for entraining lubricant in a moving air stream. These and other alternative and modified embodiments surely would also occur to others versed in this art once they were apprised of my invention. Accordingly, it is my intention that the invention be construed broadly and limited only by the scope of the claims appended hereto.

I claim:

1. In a lubricator apparatus, improved structure for entraining lubricant in a gas stream flowing within a gas flow path comprising:

a reservoir for containing a volume of lubricant which is capable of forming a dispersion of liquid lubricant particles;

means for entraining gas as within such a volume of lubricant;

such volume of lubricant including a free surface, and said reservoir including a space adjacent such free surface and extending intermediate such free surface and such gas flow path;

said free surface being adapted to allow said gas to escape from such volume of lubricant thereby creating a dispersion of such liquid lubricant particles within said space;

means for impelling such liquid lubricant particles through said space toward such gas flow path;

filter means disposed within said space and operable to capture such liquid lubricant particles larger than a selected size and to allow such liquid lubricant particles smaller than said selected size to pass through said filter means and continue moving toward such gas flow path; and means for entraining at least some of such liquid lubricant particles which pass through said filter means within the gas stream flowing in such gas flow path.

2. The improved structure as set forth in claim 1 wherein said means for entraining gas within such volume of lubricant includes an aerating means.

3. The improved structure as set forth in claim 2 wherein said aerating means includes a porous septum.

4. The improved structure as set forth in claim 2 wherein said aerating means includes a sparger.

5. The improved structure as set forth in claim 1 wherein said filter means includes a filter media means extending across at least a major portion of said space and disposed intermediate a pair of confinement means for confining said filter media means with respect to said space.

6. The improved structure as set forth in claim 5 wherein at least one of said confinement means includes a perforated member generally coextensive with said filter media means.

7. The improved structure as set forth in claim 6 wherein said perforated member includes an expanse of screen material.

8. The improved structure as set forth in claim 5 wherein said filter media means includes an expanse of fiberglass material.

9. The improved structure as set forth in claim 8 wherein said expanse of fiberglass material includes a blend of glass strands and microfibers.

10. The improved structure as set forth in claim 5 additionally including backing means disposed intermediate said filter media means and at least one of said confinement means.

11. The improved structure as set forth in claim 10 wherein said backing means includes woven fiberglass fabric.

12. The improved structure as set forth in claim 1 wherein said filter means includes a filter media body having an encompassing wall which surrounds a through opening formed therein, said through opening forming a portion of such gas flow path, and said encompassing wall having an exterior wall portion which is exposed to such liquid lubricant particles within said space to permit at least some of such liquid lubricant particles to pass through said encompassing wall from said space and into such gas flow path.

13. The improved structure as forth in claim 12 wherein said filter media body includes porous material having a property of controlled permeability.

14. The improved structure as set forth in claim 13 wherein said porous material has plural, omnidirectional, interconnecting pores throughout at least a portion thereof such that said interconnecting pores permit such liquid lubricant particles to pass through said encompassing wall from said space into such gas flow path.

15. The improved structure as set forth in claim 14 wherein said porous material is high density polyethylene.

16. The improved structure as set forth in claim 14 wherein said porous material is sintered bronze.

17. The improved structure as set forth in claim 14 wherein said porous material is sintered stainless steel.

18. The improved structure as set forth in claim 14 wherein the size of said interconnecting pores is in the range from approximately 0.2 microns to approximately 100 microns.

19. In a lubricator apparatus, improved structure for entraining liquid lubricant in a gas stream flowing in a gas flow path comprising:

a reservoir for containing a volume of lubricant which is capable of forming a dispersion of liquid lubricant particles;

means for entraining gas within such a volume of lubricant;

such volume of lubricant including a free surface, and said reservoir including a space adjacent such free surface and extending intermediate such free surface and such gas flow path;

such free surface being adapted to allow said gas to escape such volume of lubricant thereby creating a dispersion of liquid lubricant particles within said space;

means for impelling said liquid lubricant particles through said space toward such gas flow path;

a filter media body disposed within said space and including an encompassing wall surrounding a through opening which forms a portion of such gas flow path;

said encompassing wall having an exterior wall portion which is exposed to said space to permit at least some of such liquid lubricant particles moving within said space to pass through said encompassing wall from said space and into such gas flow path to become entrained within the gas stream flowing within such gas flow path.

20. The improved structure as forth in claim 19 wherein said filter media body includes porous material having a property of controlled permeability.

21. The improved structure as set forth in claim 20 wherein said porous material has plural, omnidirectional, interconnecting pores throughout at least a portion thereof such that said interconnecting pores permit such liquid lubricant particles to pass through said encompassing wall from said space into such gas flow path.

22. The improved structure as set forth in claim 21 wherein said porous material is high density polyethylene.

23. The improved structure as set forth in claim 21 wherein said porous material is sintered bronze.

24. The improved structure as set forth in claim 21 wherein said porous material is sintered stainless steel.

25. The improved structure as set forth in claim 21 wherein the size of said interconnecting pores is in the range from approximately 0.2 microns to approximately 100 microns.

26. In a lubricator apparatus having a gas flow path including a restricted throat portion through which a stream of gas flows and within which a particle media is entrained in such gas stream, the improvement comprising:

at least a portion of said restricted throat portion of such gas flow path being formed by a filter media body having an encompassing wall surrounding a through opening which forms said portion of such gas flow path, and said encompassing wall having an exterior wall portion and a property of controlled permeability to permit such particle media to pass through said encompassing wall from said exterior wall portion into said restricted throat portion to allow such particle media to become entrained in such gas stream as it flows through said restricted throat portion.

27. The improved structure as forth in claim 26 wherein said filter media body includes porous material having said property of controlled permeability.

28. The improved structure as set forth in claim 27 wherein said porous material has plural, omnidirectional, interconnecting pores throughout at least a portion thereof such that said interconnecting pores permit such liquid lubricant particles to pass through said encompassing wall from said space into such gas flow path.

29. The improved structure as set forth in claim 28 wherein said porous material is high density polyethylene.

30. The improved structure as set forth in claim 28 wherein said porous material is sintered bronze.

31. The improved structure as set forth in claim 28 wherein said porous material is sintered stainless steel.

32. The improved structure as set forth in claim 28 wherein the size of said interconnecting pores is in the range from approximately 0.2 microns to approximately 100 microns.

33. In a lubricator apparatus having a gas flow path with a restricted throat portion through which a stream of gas flows and within which a particle media is entrained in such a gas stream, the improvement comprising:

said restricted throat portion being formed at least partially by a permeable means having an interior wall which at least partially encompasses a longitudinally extending part of said restricted throat portion to form a peripheral interior wall portion thereof, and said permeable means being adapted to be exposed to a source of such a particle media whereby such particle media is able to move through said permeable means and traverse said interior wall to pass into said restricted throat portion for entrainment in such a gas stream flowing through said restricted throat portion.

* * * * *